US011400381B2

(12) United States Patent
Arroyo Palacios et al.

(10) Patent No.: US 11,400,381 B2
(45) Date of Patent: Aug. 2, 2022

(54) VIRTUAL INFLUENCERS FOR NARRATION OF SPECTATED VIDEO GAMES

(71) Applicant: Sony Interactive Entertainment Inc., Tokyo (JP)

(72) Inventors: Jorge Arroyo Palacios, San Mateo, CA (US); Justice Adams, San Mateo, CA (US); Mario M. Sarria, Jr., San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 159 days.

(21) Appl. No.: 16/852,362

(22) Filed: Apr. 17, 2020

(65) Prior Publication Data
US 2021/0322888 A1 Oct. 21, 2021

(51) Int. Cl.
*A63F 13/86* (2014.01)
*A63F 13/42* (2014.01)
*G06F 40/30* (2020.01)
*A63F 13/87* (2014.01)

(52) U.S. Cl.
CPC .............. *A63F 13/86* (2014.09); *A63F 13/42* (2014.09); *G06F 40/30* (2020.01); *A63F 13/87* (2014.09)

(58) Field of Classification Search
CPC ........................................ A63F 13/86
See application file for complete search history.

(56) References Cited

U.S. PATENT DOCUMENTS

| 2014/0004951 | A1 | 1/2014 | Kern et al. |
| 2017/0003740 | A1* | 1/2017 | Verfaillie ................ G06F 3/013 |
| 2017/0072324 | A1* | 3/2017 | Navok .................. A63F 13/847 |
| 2017/0182426 | A1 | 6/2017 | Loeb et al. |
| 2019/0262723 | A1 | 8/2019 | Trombetta et al. |
| 2020/0406152 | A1 | 12/2020 | Trombetta et al. |
| 2021/0178262 | A1* | 6/2021 | Kawakami ............ A63F 13/358 |
| 2021/0275913 | A1* | 9/2021 | Nomura .................. G06F 13/00 |
| 2021/0322888 | A1* | 10/2021 | Arroyo Palacios ..... A63F 13/87 |

OTHER PUBLICATIONS

PCT/US2021027143, Notification of Transmittal of the International Search Report and the Written Opinion of the International Searching Authority, or the Declaration, PCT/ISA/220, and the International Search Report, PCT/ISA/210, dated Jul. 8, 2021.

* cited by examiner

*Primary Examiner* — Jay Trent Liddle
(74) *Attorney, Agent, or Firm* — Penilla IP, APC

(57) ABSTRACT

A method, including: executing a video game; enabling spectating of gameplay of the video game, over a network, by a plurality of spectators; receiving, over the network, comments from the spectators during the spectating of the video game; using a semantic analysis process to analyze the comments to determine content of the comments; responsive to the content of the comments, performing an action by a virtual character that is presented to the spectators.

16 Claims, 11 Drawing Sheets

VIRTUAL INFLUENCERS FOR NARRATION OF SPECTATED VIDEO GAMES

BACKGROUND

Field of the Disclosure

The present disclosure relates to systems and methods for enabling a virtual character to provide narration and comments to enhance spectating of gameplay of a video game.

Description of the Related Art

An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for enabling a virtual character to provide narration and comments to enhance spectating of gameplay of a video game.

In some implementations, a method is provided, including the following operations: executing a video game; enabling spectating of gameplay of the video game, over a network, by a plurality of spectators; receiving, over the network, comments from the spectators during the spectating of the video game; using a semantic analysis process to analyze the comments to determine content of the comments; responsive to the content of the comments, performing an action by a virtual character that is presented to the spectators.

In some implementations, executing the video game includes receiving interactive input over the network from one or more client devices that are respectively associated to one or more players, and streaming video of the gameplay of the video game to the one or more client devices.

In some implementations, enabling spectating of the video game includes streaming video of the gameplay of the video game over the network to client devices that are respectively associated to the spectators.

In some implementations, the action performed by the virtual character includes audio voice narration by the virtual character that is presented to the spectators.

In some implementations, the audio voice narration is responsive to one or more of the comments.

In some implementations, the action performed by the virtual character includes generating a comment by the virtual character.

In some implementations, the comment by the virtual character is responsive to one or more of the comments from the spectators.

In some implementations, the comments from the spectators are defined by text information, and wherein the recognition process is configured to analyze the text information.

In some implementations, the method further comprises: responsive to the content of the comments, then analyzing the gameplay to identify an event occurring in the gameplay based on one or more of the comments.

In some implementations a non-transitory computer readable medium is provided having program instructions embodied thereon, said program instructions configured, when executed by at least one computing device, to cause said at least one computing device to perform a method comprising: executing a video game; enabling spectating of gameplay of the video game, over a network, by a plurality of spectators; receiving, over the network, comments from the spectators during the spectating of the video game; using a semantic analysis process to analyze the comments to determine content of the comments; responsive to the content of the comments, performing an action by a virtual character that is presented to the spectators.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Figure 1:
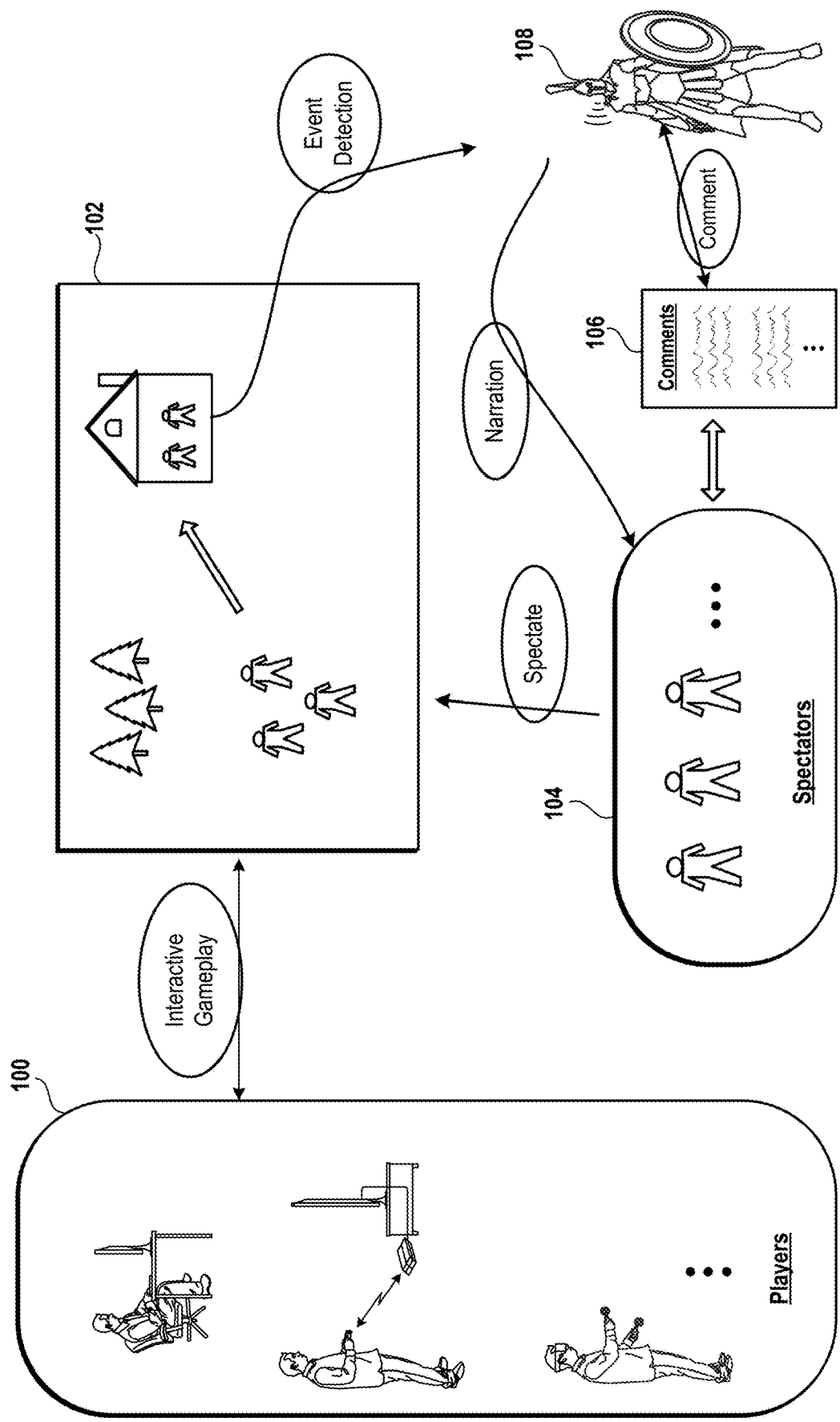
FIG. 1 conceptually illustrates a virtual character narrating gameplay of a video game, in accordance with implementations of the disclosure.

FIG. 1 conceptually illustrates a virtual character narrating gameplay of a video game, in accordance with implementations of the disclosure. In the illustrated implementation, one or more players 100 are engaged in gameplay of a video game. The gameplay of the video game may take place in a virtual environment 102 of the video game. Broadly speaking, the virtual environment of the video game can be defined by a virtual space, scene, chapter, level, a temporal aspect, timeline, storyline, and/or any other aspect of the video game in which gameplay occurs. In some implementations, the video game is locally executed by devices which are local to the players, such as computers, game consoles, mobile devices, etc. In some implementations, the video game is cloud executed by a cloud game machine, with the gameplay being streamed over a network to client devices that are associated to the players. Streaming gameplay generally includes receiving over the network inputs from client devices that are applied to the executing video game by the cloud game machine, and transmitting gameplay video (which can include audio) over the network to the client devices.

It will be appreciated that the players of a video game can engage in interactive gameplay through various device configurations. For example, in some implementations, a given player could use a desktop PC with a monitor for viewing, and provide input using a keyboard and mouse. In some implementations, a player uses a gaming console that renders video to a television or other display, and uses a gaming controller to provide input for the video game. In some implementations, a player views gameplay through a head-mounted display (HMD), and operates motion controllers to provide input to the video game. In some implementations, a player uses a mobile device such as a cellular phone, tablet, etc. to view the gameplay. It will be appreciated that any configuration of hardware devices facilitating interactive gameplay, including viewing of gameplay video and providing input to the executing video game, can be utilized to facilitate the implementations of the disclosure.

In accordance with implementations of the disclosure, one or more spectators 104 can spectate the gameplay of the video game. Broadly speaking, this entails viewing video of the gameplay by the spectators. Such video can be streamed over a network to various client devices which are respectively associated to the spectators and configured to render the gameplay video to respective displays. It will be appreciated that similar hardware configurations as those provided for the players 100 can be associated to the spectators 104. The gameplay video can be made available to the spectators through various platforms, such as a website, a gaming platform (local or cloud), a social media platform, video sharing site, an app, etc.

Additionally, there can be various views provided to the spectators in accordance with implementations of the disclosure. In some implementations, the views can be the same as or similar to those of the players 100, for example enabling spectators to follow individual players as they play the video game. In some implementations, the views can be different from those of the players, and can also be configurable or selectable by the spectators. For example, in some implementations, spectators can move freely within the virtual environment 102 to access viewpoints of their own choosing. In some implementations, spectators can move to predefined viewing locations within the virtual environment 102.

As the spectators 104 spectate the gameplay of the video game, they may generate comments 106 in response. In some implementations, the comments are defined by strings of text. In some implementations, the comments are defined by other forms of information such as audio or video information. In some implementations, the comments 106 are visualized as a stream that is displayed on-screen, for example as an overlay or in a sidebar, to be read or viewed by the spectators. In some implementations, the comments can be also made visible or accessible to the players 100.

Broadly speaking, implementations of the present disclosure are drawn to the use of a virtual character 108 to enhance the experience of spectators as they spectate gameplay of the video game. The virtual character 108 can be any kind of fictional character or virtual object which can be personified. Examples of virtual characters include characters in video games, fictional media characters such as those from books/comics/television shows/movies/etc., animated characters, etc. The virtual character 108 can be popular or recognizable from various channels of communication such as social media, television entertainment, commercials, etc. While the virtual character 108 is generally contemplated as an entirely fictional entity, in some implementations the virtual character 108 can be a virtualized representation of a real life person, living or historical. Broadly speaking, the virtual character 108 can be any virtual entity that will be recognized by the spectators as the source of activity that is configured to enhance the spectators' experience, as further described herein. That is, the actions which enhance the spectators' experience as described further below are configured so as to be attributed to the virtual character 108 by the spectators. In this way, the virtual character 108 is configured to as to appear to be an actor or agent in the spectating context of the video game.

In some implementations, the virtual character 108 provides narration of the gameplay of the video game. That is, events occurring during the gameplay of the video game are monitored and detected, and commentary is generated and vocalized by the virtual character 108. In some implementations, the system can monitor activity of the video game and detect events, which may trigger commentary to be generated. Various examples of events which may trigger generation of commentary by the virtual character 108 include, by way of example without limitation, kills, player deaths, acquisitions of virtual objects or skills or other types of virtual inventory, movement of player characters, weapon firing, activation of an object or skill or power, scoring of points or other tracked elements, performance of a move or combination of moves, construction or destruction of a virtual entity, inflicting or incurring damage, reaching an achievement, etc. Such events can trigger generation of narration or commentary which is vocalized in the voice of the virtual character 108. The vocalization of the narration/commentary can be generated through a speech synthesis technology, for example. The resulting audio can be played back for the spectators during their spectating of the gameplay, for example, being included in an audio stream transmitted to the spectators' client devices. The audio narration can be mixed with gameplay audio from gameplay being spectated.

In some implementations, the audio narration is intelligently inserted in a manner so as to avoid interfering with other identified sounds or spoken audio. For example, spoken audio occurring in the gameplay audio can be detected, and the system can be configured to avoid inserting audio narration by the virtual character during times when spoken audio is occurring in the gameplay. In some implementations, the amount of audio narration is adjustable depending on gameplay activity and/or spectator activity. For example, the amount of audio narration can be responsive to the amount of comments being provided by spectators, e.g. increasing audio narration when there are fewer comments so as to provide additional activity when spectator activity is low. In some implementations, the amount of audio narration increases with increasing gameplay activity. In other implementations, the amount of audio narration decreases with increasing gameplay activity.

In some implementations, the narration is provided in the form of text to be read by the spectators. For example, text narration can be in the form of a text stream displayed when spectating gameplay.

In some implementations, audio or text narration is accompanied by an animation of the virtual character 108 in the spectator's view, showing the virtual character 108 speaking, for example.

In some implementations, narration can be performed by animating the virtual character 108 using sign language, so as to enable spectators that are deaf or hearing disabled to comprehend the narration by the virtual character.

In some implementations, the narration can be personalized or tailored for individual spectators. For example, the narration can be personalized based on any of various factors specific to a given spectator, such as the spectator's geolocation, nationality, age, gender, gameplay experience, trophies, achievements, cumulative gameplay time, game title library, user profile information, user preference settings, user disabilities or special needs, etc. Various aspects of the narration can be tailored based on such factors, such as the language, vocabulary, which events trigger narration/commentary, etc.

Some non-limiting specific examples of personalization include the following: setting or adjusting the language of narration based on the geo-location or nationality of the user; providing an amount of narration in inverse relationship to the amount of gameplay experience of the spectator, so that more experienced spectators receive less narration whereas less experienced spectators receive more narration (e.g. including more events to trigger narration for less experienced spectators, and conversely including fewer events, or excluding certain types of events, to trigger narration for more experienced spectators); adjusting the vocabulary of the narration based on the age of the spectator (e.g. increasing vocabulary as age increases, including/excluding words or expressions or references based on age, etc.).

In some implementations, certain types of narration are directed to all spectators, whereas other types of narration are directed to specific groups or subsets of the spectators. And furthermore, still other types of narration are directed to individual spectators on a case by case basis. In some implementations, this is accomplished by filtering the narration based on spectator characteristics or settings.

In some implementations, the virtual character 108 is responsive to the comments 106 from the spectators. For example, in some implementations, the narration by the virtual character 108 is responsive to the comments 106, thereby demonstrating awareness of the comments on the part of the virtual character 108. For example, the virtual character 108 may mention or reference a given comment as part of the narration, or respond to a specific comment, or characterize or summarize some of the comments (e.g. to describe a common idea or sentiment amongst the comments).

In some implementations, the events in the gameplay are detected based on one or more of the comments. For example, comments can be semantically analyzed to identify which events to search for and detect. It is noted that as comments may relate to events that have occurred in the recent past, then buffered gameplay may be searched to identify past events that have been commented upon.

In some implementations, the virtual character 108 may generate comments that are configured to become part of the comments 106. Thus, comments attributed to the virtual character 108 are generated and inserted into the comments stream that is provided to the users.

Figure 2:
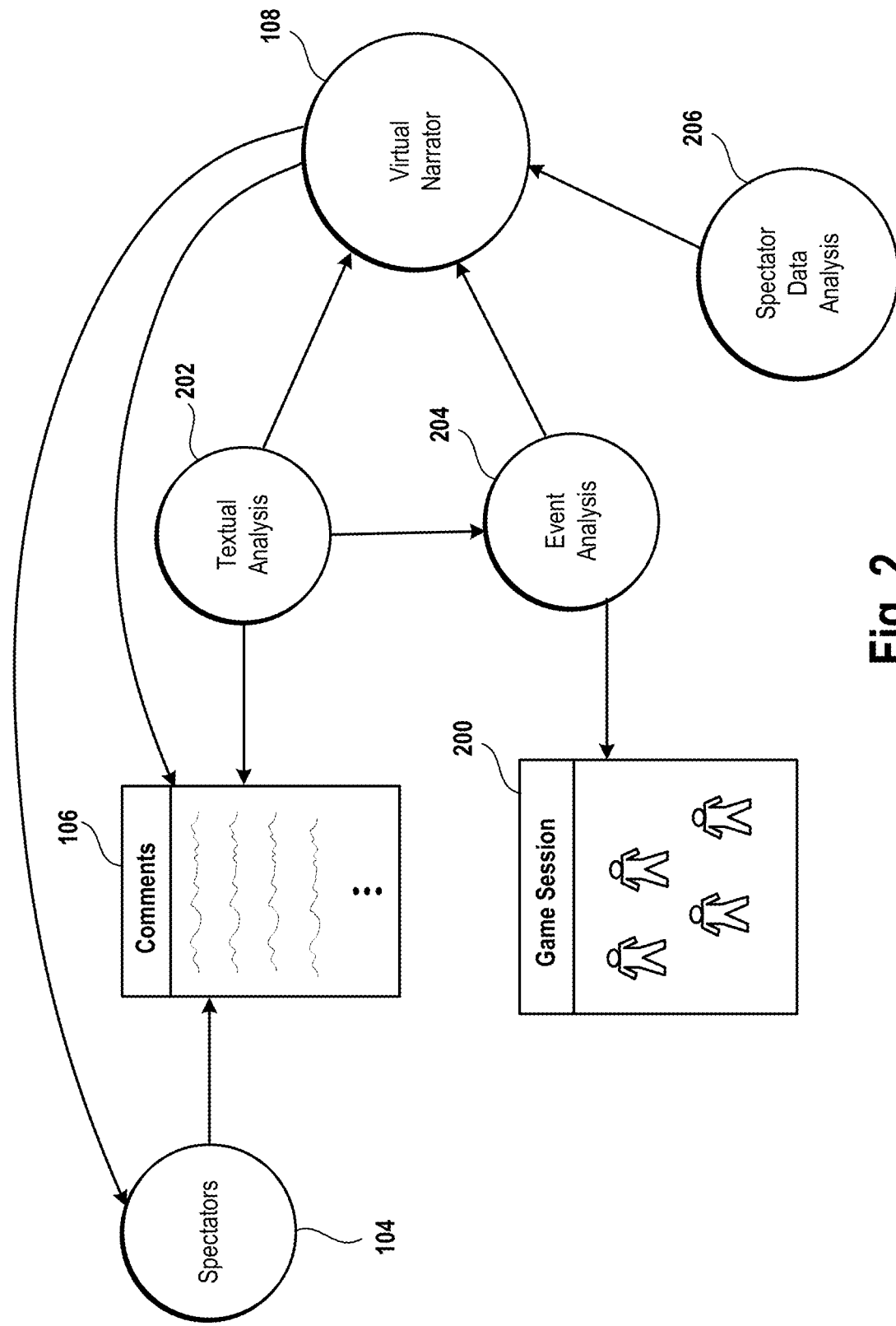
FIG. 2 conceptually illustrates a virtual character 108 providing narration/commentary and comments based on spectator data and comments from spectators, in accordance with implementations of the disclosure.

FIG. 2 conceptually illustrates a virtual character 108 providing narration/commentary and comments based on spectator data and comments from spectators, in accordance with implementations of the disclosure. A textual analysis process 202 can be performed to analyze the text of the comments 106 provided by the spectators, and determine the semantic meaning of the comments 106. By way of example without limitation, the text analysis process 202 may employ any of various methods for obtaining the meaning of text, including any natural language processing or semantic analysis technique. Such techniques may employ a machine learning process to enable the semantic understanding of text.

Based on the determined semantic meaning of one or more of the comments, the virtual character 108 can be configured to provide a responsive action, such as responding to or otherwise referencing the comments in narration that is provided to the spectators 104, or responding to the comments by adding a comment that is attributed to the virtual character 108. In some implementations, a machine learning process is trained using a corpus of existing comments, to enable the machine learning process to generate comments and/or narration that is appropriately responsive to new comments.

In some implementations, an event analysis process 204 is performed based on the determined semantic meaning of the comments, as determined through the textual analysis process 202. The event analysis process 204 analyzes events occurring in the gameplay session 200 of the video game based on the determined semantic meaning of the comments 106. The event analysis process 204 can analyze currently occurring events as well as events which have occurred previously, for example from a buffer or otherwise recorded storage of previous gameplay. It will be appreciated that it is useful to examine previously recorded gameplay, as a given comment, at the time it is written, will often pertain to something that has already occurred. By detecting and analyzing the gameplay to which a comment refers, so the system can provide better narration and/or comments attributed to the virtual character.

In some implementations, spectator data is analyzed (ref. 206) and applied for narration/comments by the virtual character 108. By way of example without limitation, such spectator data can include age, location, gender, date of birth, etc. For example, the virtual character 108 could be configured to say happy birthday to a given player, or call out that a given player is spectating from a particular city, etc.

In some implementations, the event analysis process 204 is configured to broadcast events to other virtual narrators of other concurrently running games being narrated by the other virtual narrators. For example, in a video game tournament (such as a large eSports event) there are often multiple games played at the same time. Each game may have its own virtual narrator, and thus each virtual narrator can be configured to also receive updates from other concurrent games and comment on the status of the other games being played at the same time.

Figure 3:
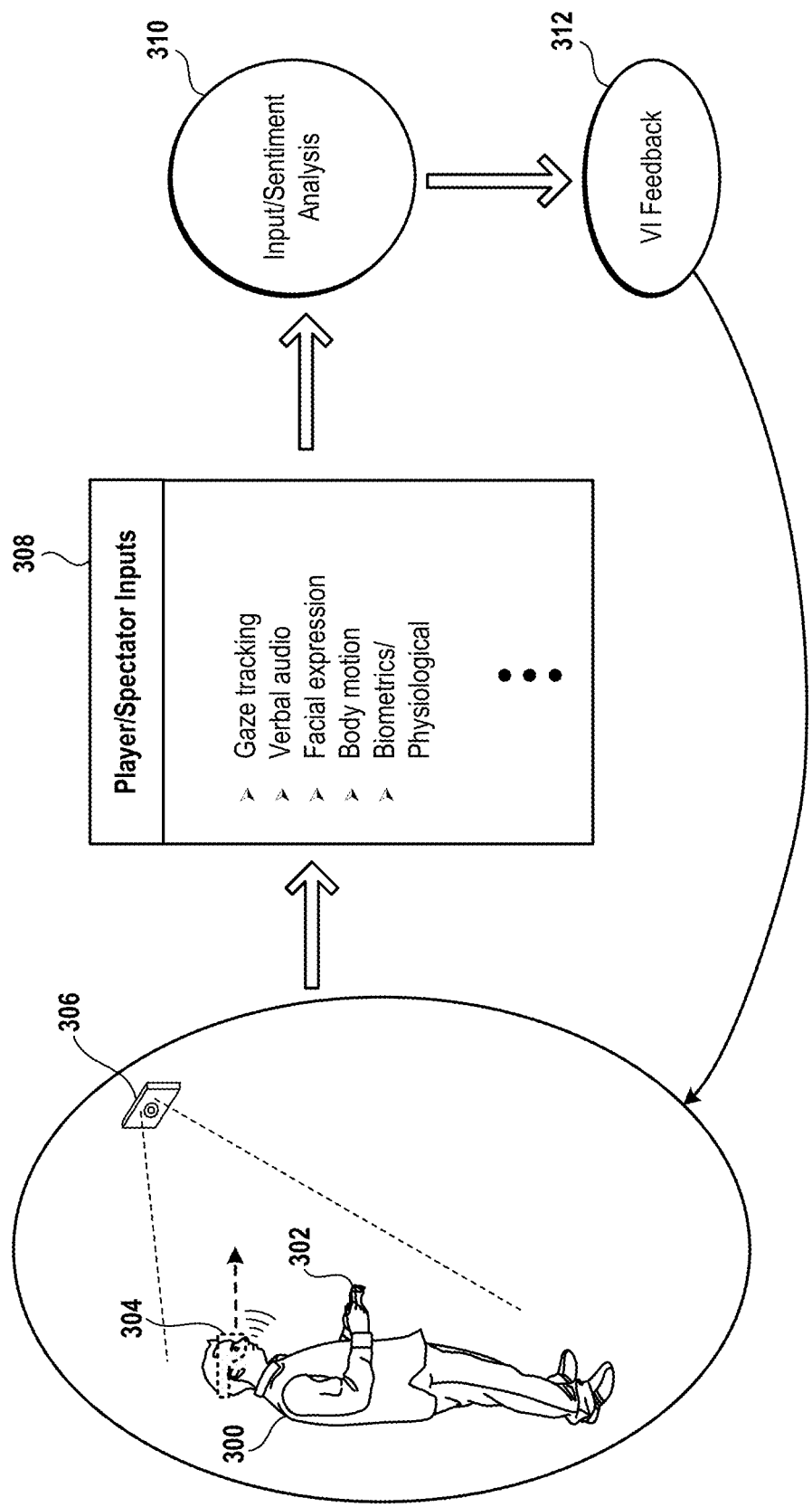
FIG. 3 conceptually illustrates user input being analyzed to enable a virtual character to provide responsive actions, in accordance with implementations of the disclosure.

FIG. 3 conceptually illustrates user input being analyzed to enable a virtual character to provide responsive actions, in accordance with implementations of the disclosure. In the illustrated implementation, a user 300 can be a spectator of a video game, or in other implementations, a player of the game. The user 300 may operate a controller 302 and view the video game through a display 304, which in some implementations, can be a head-mounted display. Also shown is a camera 306 configured to capture images of the user 300. While the user 300 can provide inputs in the form of controller inputs from operating the controller 302, other types of input can be useful for enabling a virtual character to enhance the experience.

By way of example without limitation, various inputs 308 can be considered to improve the virtual character narration. For example, gaze tracking of the user's gaze direction can be employed, such as by detecting the user's gaze by an external camera 306, or through a gaze tracking camera in the HMD 304. The gaze tracking can be used to identify what the user is looking at in the video game. The camera 306 can also be used to detect the user's motions, facial expressions, body postures, breathing patterns, etc. In some implementations, one or more cameras in the HMD 304 (including the aforementioned gaze tracking camera) are capable of viewing the user's facial expressions, such as by viewing the user's eyes and mouth. A microphone, which can be separate or included in camera 306 or HMD 304, can be used to detect user audio such as speech, breathing, or other user sounds. User motions can also be detected through motion capture by the HMD 304 and the controller 302. In some implementations, biometric data or physiological signals can be captured such as heart rate, respiration, galvanic skin resistance, etc., e.g. through sensors on the controller 302 or HMD 304.

These various types of input 308 can be analyzed (ref. 310) to infer the user's emotions, sentiments, areas of focus or intent, stress levels, etc. Such analysis can include speech recognition, natural language processing, sentiment analysis, biometrics analysis, facial expression recognition, and other types of analysis to understand the user's emotional and physiological state, their sentiments, and what they are focused on in the video game. Based on such analysis the virtual character can be configured to provide responsive narration, comments, feedback, etc.

It will be appreciated that though a single user 300 is shown, there can be a plurality of users, including tens, hundreds, or thousands of spectators.

Considering the scenario wherein the user 300 is a spectator, then the virtual character can be configured to provide narration that is based on the spectator's inputs, such as the spectator's emotional state, region of focus, sentiment, etc. For example, in some implementations, when the system detects that spectator(s) are focused on a particular region of a virtual environment then the virtual character is configured to provide narration pertaining to the particular region of the virtual environment that is the area of focus of the spectators. Events occurring in such a region are identified and commented upon by the virtual character. In some implementations, when the system detects that spectators are becoming less engaged or bored, then the virtual character is configured to provide narration or comments to engage the spectators. In some implementations, the virtual character highlights activity occurring elsewhere and directs the attention of the spectators to a particular region of the virtual environment where such activity is occurring.

In some implementations, the narration is configured to match the mood of the spectators. That is, if the system detects that spectators are excited then the narration is configured to be in a more excited tone, such as by being louder, narrating faster, narrating more events/info, or otherwise connoting excitement. Conversely, if the system detects that the spectators are calm, then the narration can be configured to take on a calmer tone, such as by being softer, narrating slower, narrating fewer events/info, or otherwise exhibiting a calm state. In this way, the narration is configured to match the emotional state of the spectators, and thereby provide a more natural feeling to the narration.

Figure 4:
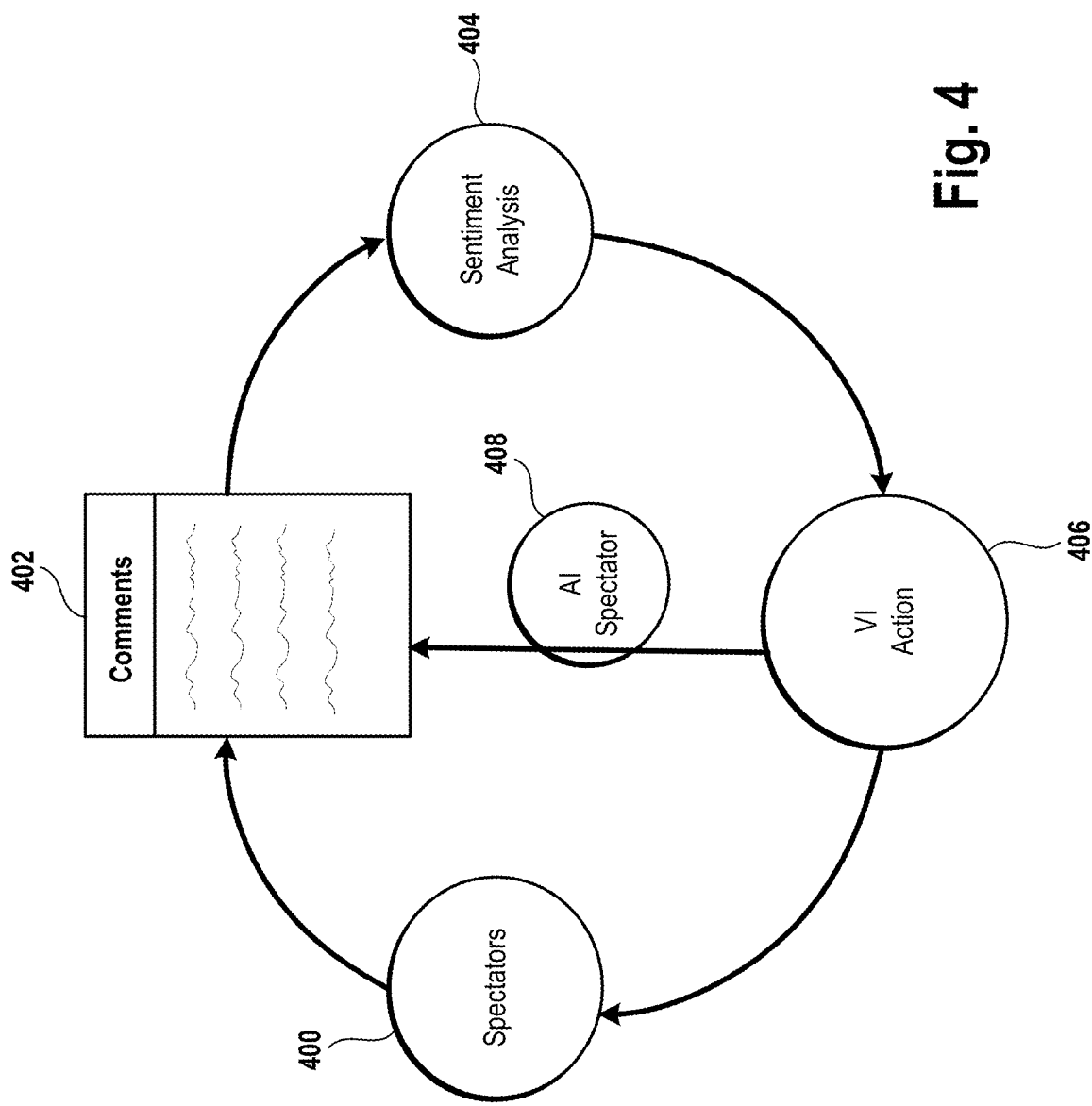
FIG. 4 conceptually illustrates a virtual character/influencer taking actions responsive to comments from spectators of a video game, in accordance with implementations of the disclosure.

FIG. 4 conceptually illustrates a virtual character/influencer taking actions responsive to comments from spectators of a video game, in accordance with implementations of the disclosure. As shown, a plurality of spectators 400 generate comments 402 as they spectate a video game. As noted previously, these comments can be in the form of text strings, but may also include other information such as audio, images (e.g. emojis, GIFs, stickers, etc.), or video.

In order to understand the content of the comments 402, a sentiment analysis 404 is performed on the comments. The sentiment analysis 404 will determine the subjective information and emotional content of the comments, such as spectator attitudes and feelings. By way of example without limitation, this can include determining whether and to what extent individual or multiple spectators are feeling positive, negative, neutral, happy, excited, sad, depressed, angry, confused, tired, bored, etc. It will be appreciated that in addition to sentiment analysis, semantic analysis can be performed to determine the content and meaning of the comments 402. Both sentiment analysis and semantic analysis may rely upon natural language processing, text analysis, computational linguistics, etc.

In response to the determined sentiment and/or meaning of comments, a virtual character can be configured to take various actions. For example, the sentiment analysis can detect the average mood of the audience of spectators. If the system determines that the mood is low, then the virtual character can apply strategies to cheer up the audience. For example, the virtual character may highlight aspects of the gameplay, highlight achievements by players, provide positive or interesting commentary, provide background information, generate comments for any of the foregoing, etc.

In some implementations, if after analyzing the spectators' comments, abusive behavior is detected, then the system can take actions in response. For example, in some implementations, the system spawns virtual/AI spectators 408 to calm down the situation with comments or responses. The virtual spectators can appear as additional spectators to the real spectators, such as by generating comments that are attributed to them. Such comments can be configured to be responsive to the abusive behavior, such as by being configured to diffuse strong statements or rhetoric, advocate for appropriate behavior and peaceful discourse, interject with other comments or ideas so as to change the subject, etc.

In some implementations, if it is determined that the audience is too quiet or not engaged, then the virtual spectators can be configured to generate comments to engage the real spectators and encourage them to pay attention to something, such as an event occurring in the video game, or a player, etc.

In some implementations, the virtual spectators can have associated avatars, which can be seen by other spectators, such as in a system wherein spectator avatars are viewable in the video game virtual environment or another virtual environment.

Figure 5:
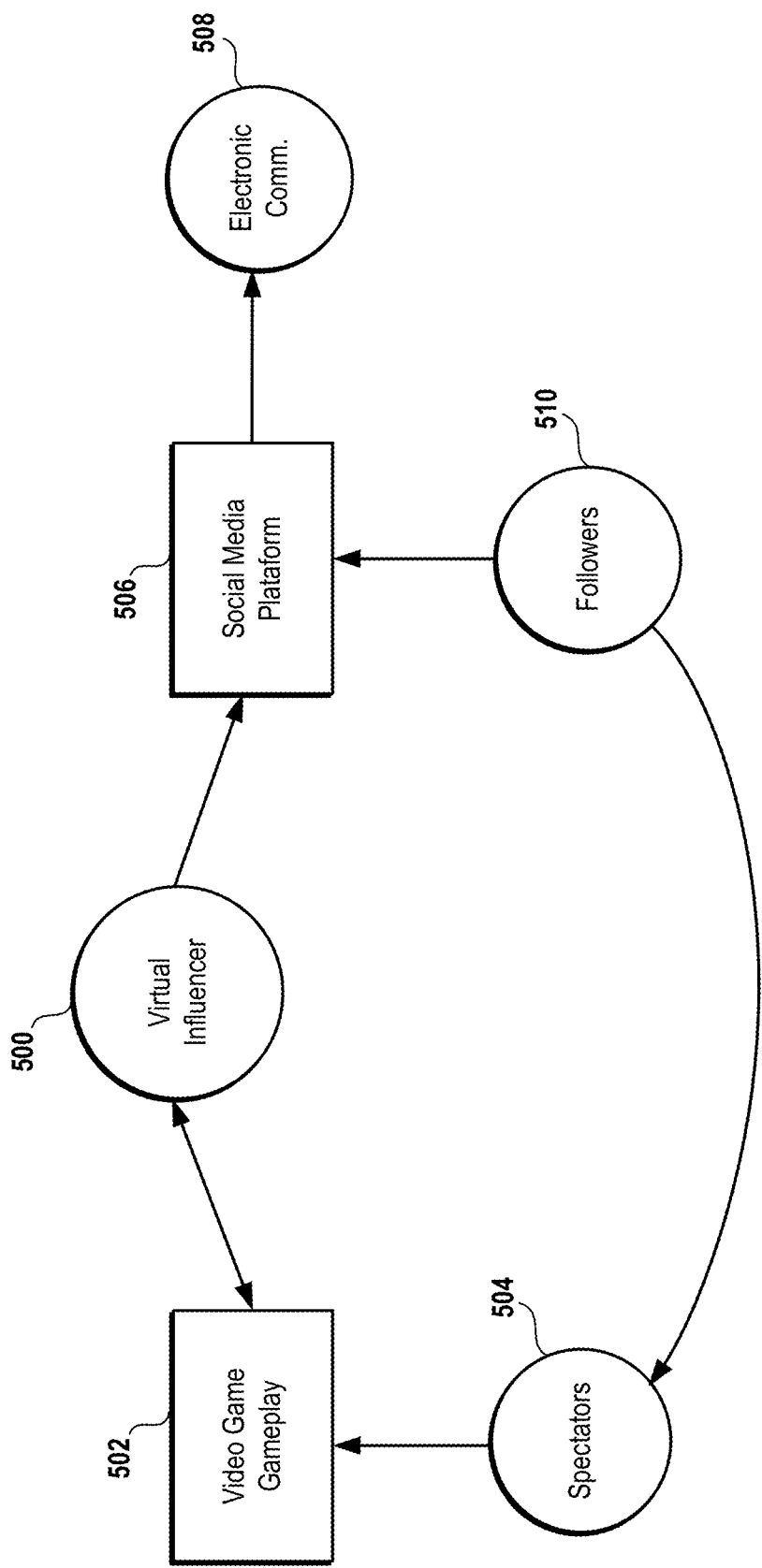
FIG. 5 conceptually illustrates a virtual character interacting with a social media platform, in accordance with implementations of the disclosure.

FIG. 5 conceptually illustrates a virtual character interacting with a social media platform, in accordance with implementations of the disclosure. As has been discussed, a virtual character/influencer 500 can provide narration and commentary regarding video game gameplay 502, thereby enhancing the experience of spectators 504 that spectate the gameplay 502. In some implementations, the virtual character 500 can also have a social media presence. That is, the virtual character 500 may be a recognized entity or individual on a social media platform 506.

Broadly speaking, a social media/network platform is a communications platform that enables users to be linked or connected to one another in social graphs, so that communications or posts shared by a given user are provided to the members of the user's social graph (or the user's followers). Examples of social media platforms include Facebook, Instagram, Twitter and the like. In accordance with implementations of the disclosure, the virtual character can have a social media presence, and be a user/member of a social media platform. That is, the virtual character will be a participant on the social media platform, and can have many followers 510 that receive communications such as posts by the virtual character on the social network. The social media platform 506 can distribute the virtual character's communications by electronic communication methods 508 such as mobile app notifications, e-mail, chat, text messaging, app messaging, surfacing in users'/followers' social media feeds, etc.

Thus, the followers 510 of the virtual character 500 will receive posts by the virtual character on the social media platform 506. In some implementations, these posts can be about the video game gameplay 502, and can serve as a mechanism for driving users to spectate or participate in the video game. Broadly speaking, the system is configured to leverage the virtual character's social media presence to draw attention to the video game and its gameplay 502. By way of example without limitation, posts/communications by the virtual character on the social media platform 506 could highlight activity occurring in the video game gameplay 502, provide screenshots or video clips of the gameplay, advocate for users to join or spectate the gameplay, indicate that the virtual character is spectating/following or narrating the gameplay, provide links to the gameplay (or to the gaming platform through which the gameplay is made available) to enable followers 510 to join or spectate, etc. Thus, some of the followers 510 of the virtual character on the social media platform 506 may become spectators 504 of the video game gameplay 502.

Figure 6:
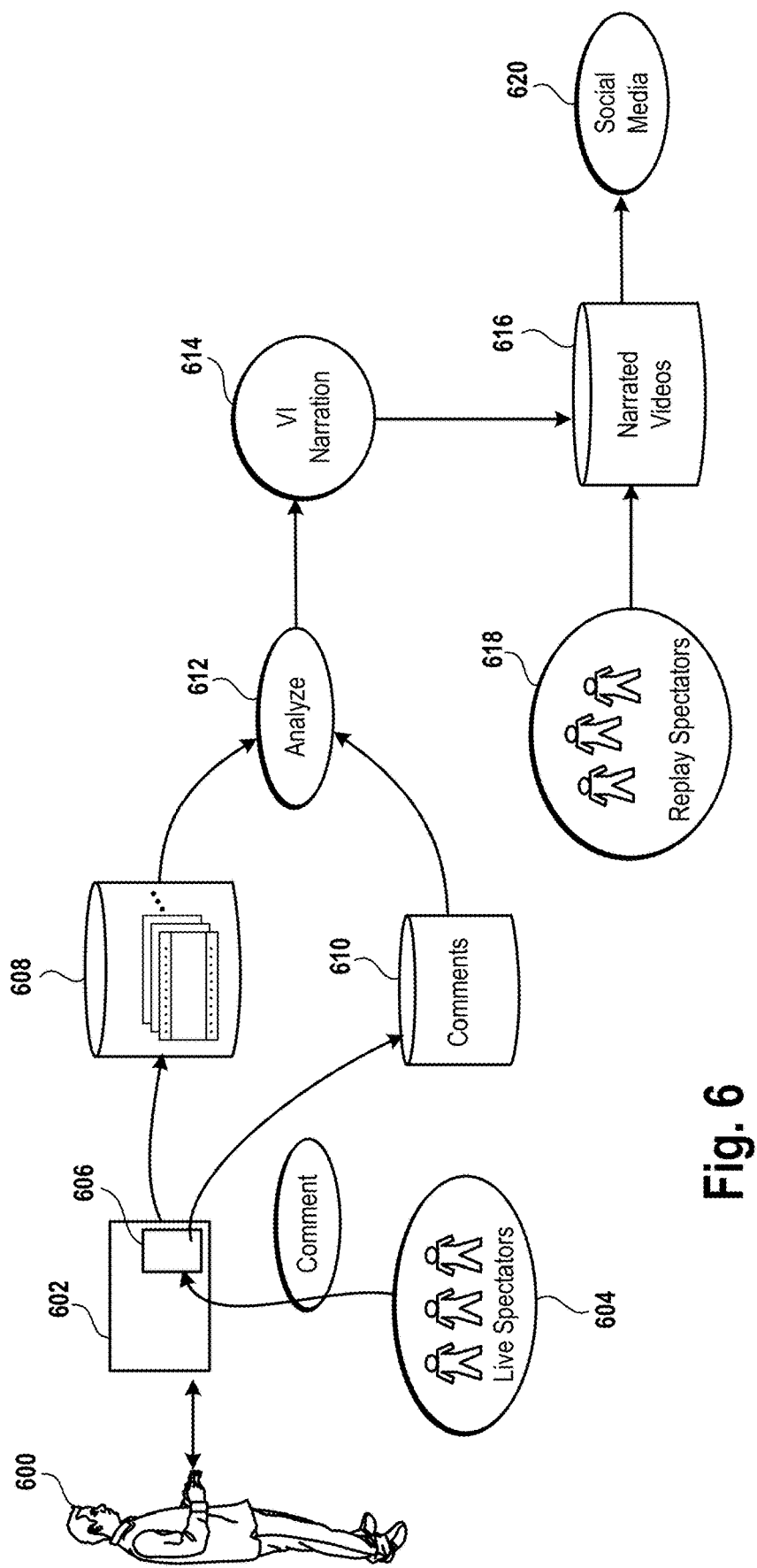
FIG. 6 conceptually illustrates post-gameplay narration provided by a virtual character, in accordance with implementations of the disclosure.

FIG. 6 conceptually illustrates post-gameplay narration provided by a virtual character, in accordance with implementations of the disclosure. While implementations have been described in which a virtual character provide narration for live gameplay as it occurs, in other implementations, a virtual character can narrate previously recorded gameplay. In the illustrated implementation, one or more players 600 engage in gameplay 602 of a video game. The gameplay of the video game, including gameplay video or data defining gameplay events can be stored to a gameplay storage 608. During the gameplay, live spectators 604 may comment on the gameplay, thereby generating comments 606, which can be displayed alongside the gameplay to the spectators 604 and even the players 600. The comments can be stored to a comments storage 610.

An analysis 612 is performed on the stored gameplay and the comments. The analysis of the gameplay and comments can be in accordance with techniques described above, and can be configured to identify events of interest in the gameplay, understand the meaning of the comments, etc. as has been described. Based on this analysis, narration 614 by the virtual character can be provided similar to that described previously, which may highlight or call attention to specific events, players, spectators, etc. The narration can be stored in association with the gameplay video, or combined with the gameplay video to form narrated gameplay videos that include narration by the virtual character.

Spectators 618 can access the narrated gameplay videos for viewing, and thereby enjoy gameplay video narrated by the virtual character, even though such narration did not occur during the original gameplay. By way of example without limitation, the narrated videos can be made accessible through various platforms, including websites, gaming platforms, video sharing platforms, etc. In some implementations, the narrated videos can be shared through social media 620. For example, a narrated video could be shared from the virtual character's social media account, thereby reaching the virtual character's followers on the social media platform.

Figure 7:
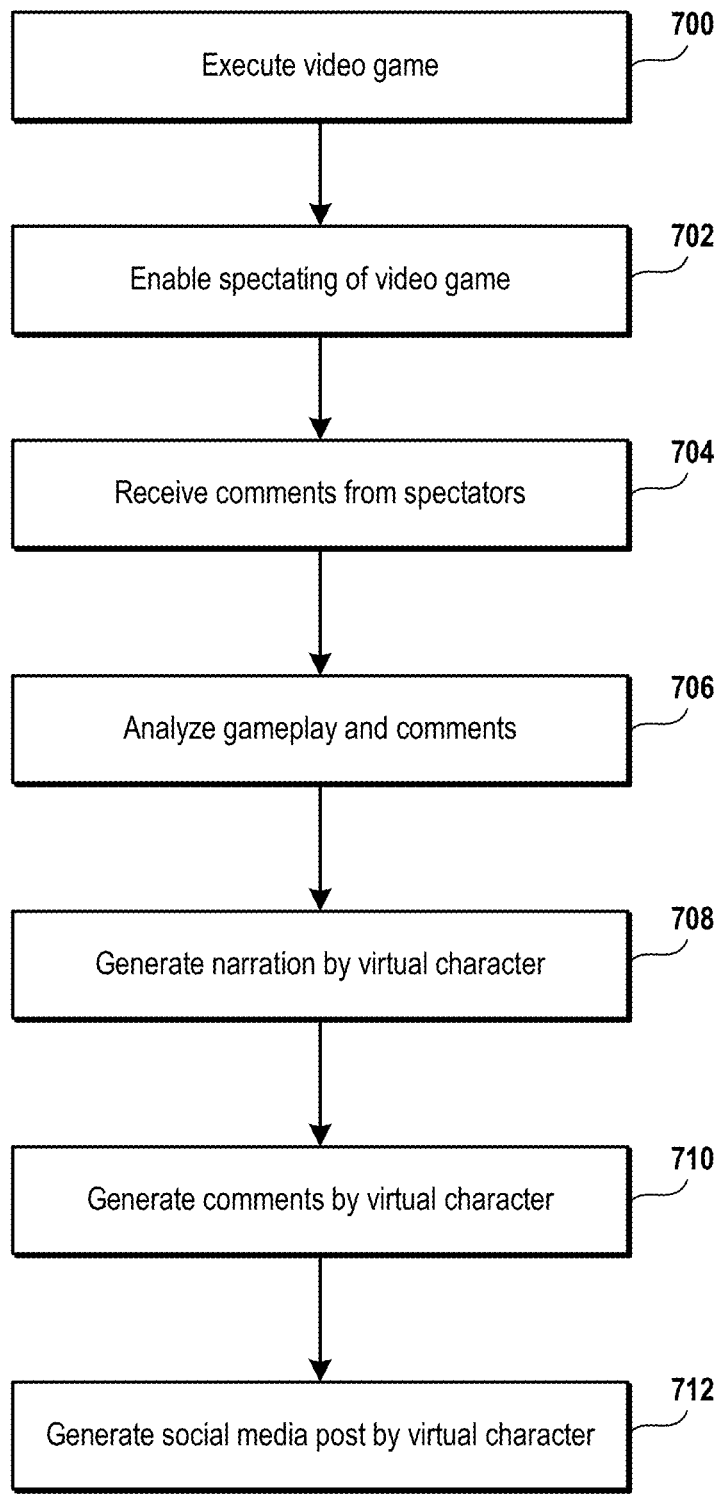
FIG. 7 illustrates a method or enabling a virtual character to enhance a spectator experience of a video game, in accordance with implementations of the disclosure.

FIG. 7 illustrates a method or enabling a virtual character to enhance a spectator experience of a video game, in accordance with implementations of the disclosure. At method operation 700, a video game is executed. The execution of the video game can be locally executed by a local device such as a computer or game console, or can be cloud executed by a cloud gaming machine in a data center. Furthermore, the execution of the video game can define a single player session or a multiplayer session of the video game. At method operation 702, the system enables spectating of the video game by one or more spectators. To enable spectating of the video game, gameplay video generated by the session of the video game can be processed (e.g. compressed using a video codec) and streamed over a network to various spectator devices through which the spectators may view the gameplay video of the video game.

At method operation 704, comments are received from the spectators. As has been described, such comments can include strings of text information, as well as other types of information communicated by the spectators as they spectate the gameplay of the video game. Such comments can be in response to the gameplay of the video game, and may also be in response to other comments from other spectators. At method operation 706, the gameplay of the video game and comments are analyzed. The analysis of the gameplay and comments can be configured to identify events occurring in the gameplay, semantically understand the content of the comments, understand the sentiments of the spectators, etc.

Based on the analysis described above, then at method operation 708, narration by the virtual character is generated. By way of example, such narration may include commentary regarding events occurring in the game play, responses to comments from the spectators, etc. Additionally, at method operation 710, comments can be generated which are attributed to the virtual character. Such comments may relate to events occurring in the gameplay, be responsive to other comments, etc. These comments can appear in a stream of comments which are viewable by the spectators.

At method operation 712, a social media post is generated on behalf of the virtual character, such as a post attributed to a social media account of the virtual character. The social media post can be configured to identify or otherwise pertain to the gameplay of the video game. In some implementations, the social media post is configured to make others aware of the gameplay of the video game, and may include links to where a spectator may be able to spectate the gameplay (e.g. website, app, etc.).

Figure 8:
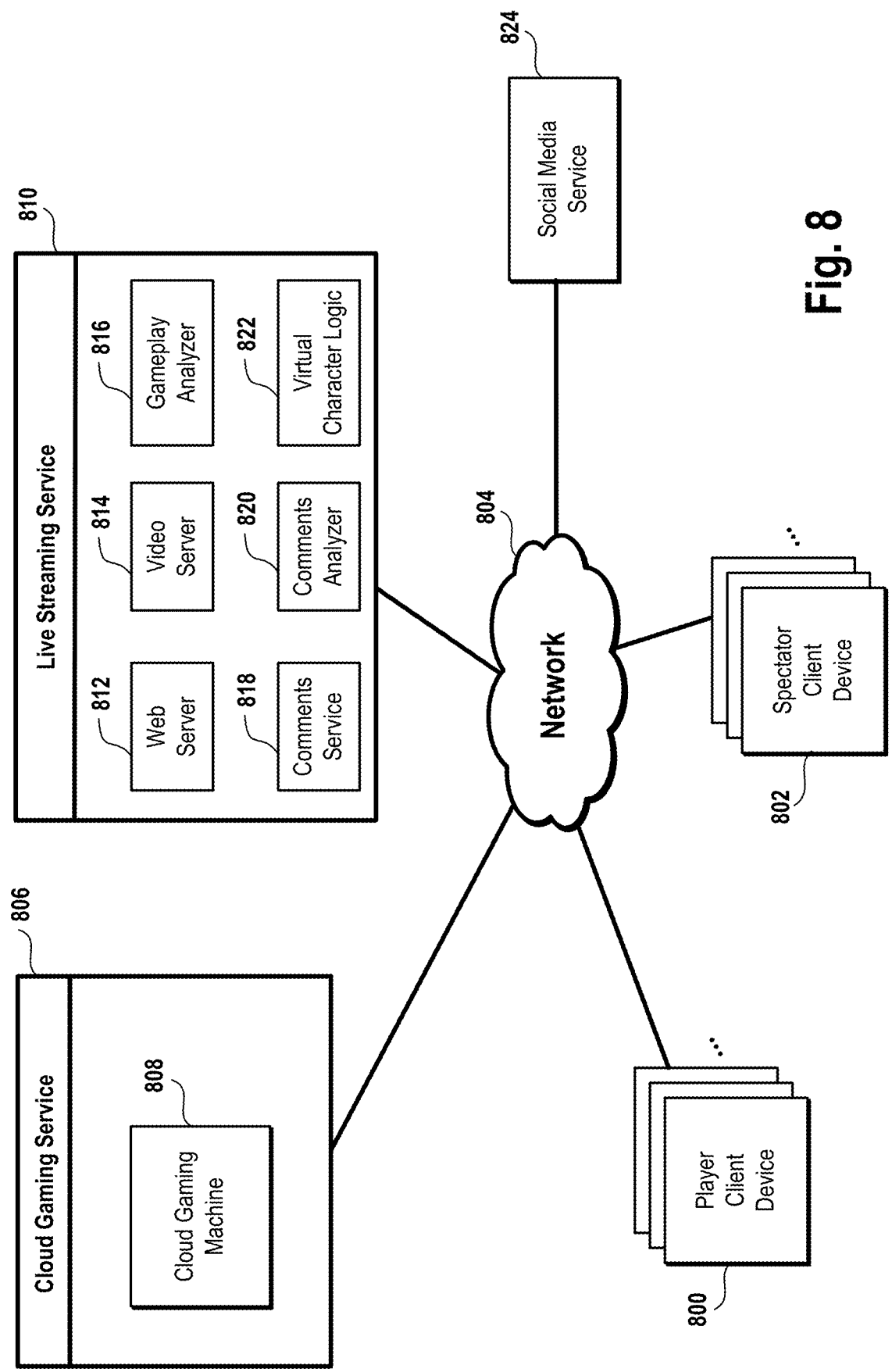
FIG. 8 illustrates a system for enabling a virtual character to enhance a spectator experience of a video game, in accordance with implementations of the disclosure.

FIG. 8 illustrates a system for enabling a virtual character to enhance a spectator experience of a video game, in accordance with implementations of the disclosure. In the illustrated implementation, players of the video game operate player client devices 800, such as personal computers, game consoles, mobile devices, etc. In some implementations, the video game is executed on one or more of the player client devices; whereas in other implementations the video game is executed by a cloud gaming machine of a cloud gaming service, and gameplay is streamed over the network 804 between the cloud gaming service 806 and the player client devices 800. It will be appreciated that the cloud gaming service 806 can reside in one or more data centers having sufficient hardware/software resources to provide online game streaming.

A live streaming service 810 is configured to enable spectator viewing of the gameplay of the video game. In some implementations, the live streaming service receives the gameplay video, whether from a player client device 800 or the cloud gaming service 806, and distributes the gameplay video over the network 804 to the spectator client devices 802, through which the spectators are able to view the gameplay video. In some implementations, the live streaming service and/or the cloud gaming service can enable spectators to control their point of view within a virtual space of the video game, such as by enabling spectators to control their location and/or view direction within the virtual space. In this manner, spectators can have individualized views of the virtual space of the video game. In some implementations, the live streaming service 810 streams the game state, or a portion thereof, to the client devices 802, and the client devices 802 run a copy or version of the video game that enables spectating based on the received game state. The spectator view of the video game is therefore rendered at the client device, but using game state data that is received from the live streaming service 810. This can further facilitate user-defined viewpoints, allowing spectators to control their view, as described above. In some implementations, the copy of the video game at the client device is configured to have a spectating mode that facilitates such rendering for spectating purposes.

In the illustrated implementation, the live streaming service 810 includes a web server 812 that provides a website or webpage for spectating the video game. In some implementations, a video server 814 is provided for handling distribution of video that provides the spectator view to a given spectator. In some implementations, a comments service 818 is configured to enable comments to be received from the spectators, and posted for viewing by the spectators.

A gameplay analyzer 816 is configured to analyze gameplay occurring in the video game session, so as to identify events and other information based on the gameplay. In some implementations, a comments analyzer 820 is configured to analyze comments by the spectators and understand their meaning.

Virtual character logic 822 is configured to carry out actions that are attributed to a virtual character, such as providing narration and comments as discussed above, which are based on the analysis of the gameplay and the comments. Such narration and comments are transmitted over the network 804 to the spectator client devices.

Additionally, in some implementations, the virtual character logic 822 can access a social media service 824, for example, to enable the virtual character to post to the social media service (i.e. posts are generated on behalf of the virtual character, such as via a social media account of the virtual character). Such posts can reference the gameplay of the video game, include images or video from the gameplay, include a link to a site where a user may spectate the gameplay, etc. It will be appreciated that the posts to social media are configured to appear to other social media user as originating from the virtual character.

Broadly speaking, implementations of the present disclosure have been described in which spectators spectate gameplay of a video game over a network. However, in other implementations, methods and systems of the present disclosure are applied in the context of e-sports which are spectated by spectators in a common space such as an arena or stadium, and optionally using common displays. That is, a virtual character can be configured to perform narration and comments related to spectated gameplay of video game as described above, but such narration and comments can be rendered for listening/viewing in the common space in which the spectators are gathered (e.g. playing back narration through speakers, and projecting comments by the virtual character onto a display/screen that is viewed in common by the spectators.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 9A:
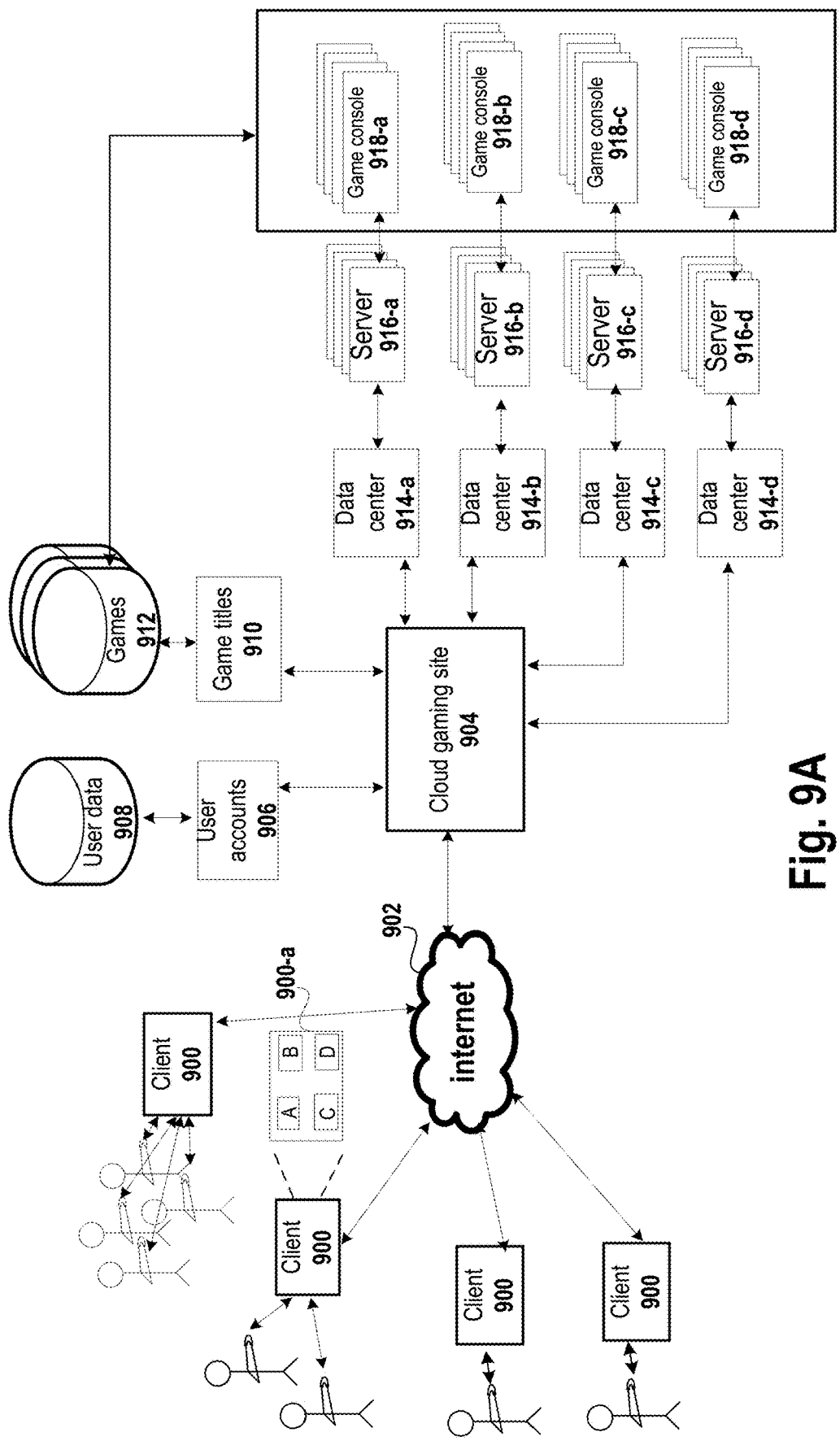
FIG. 9A illustrates an exemplary system used to load game files for a game available through a cloud gaming site, in accordance with implementations of the disclosure.

FIG. 9A illustrates an exemplary system used to load game files for a game available through a cloud gaming site. The system includes a plurality of client devices 900 that are communicatively connected to the cloud gaming site 904 over a network 902, which can include a LAN, wired, wireless, cellular (e.g. 4G, 5G, etc.), or any other type of data network, including the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900-*a*, as shown in FIG. 9A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 9B:
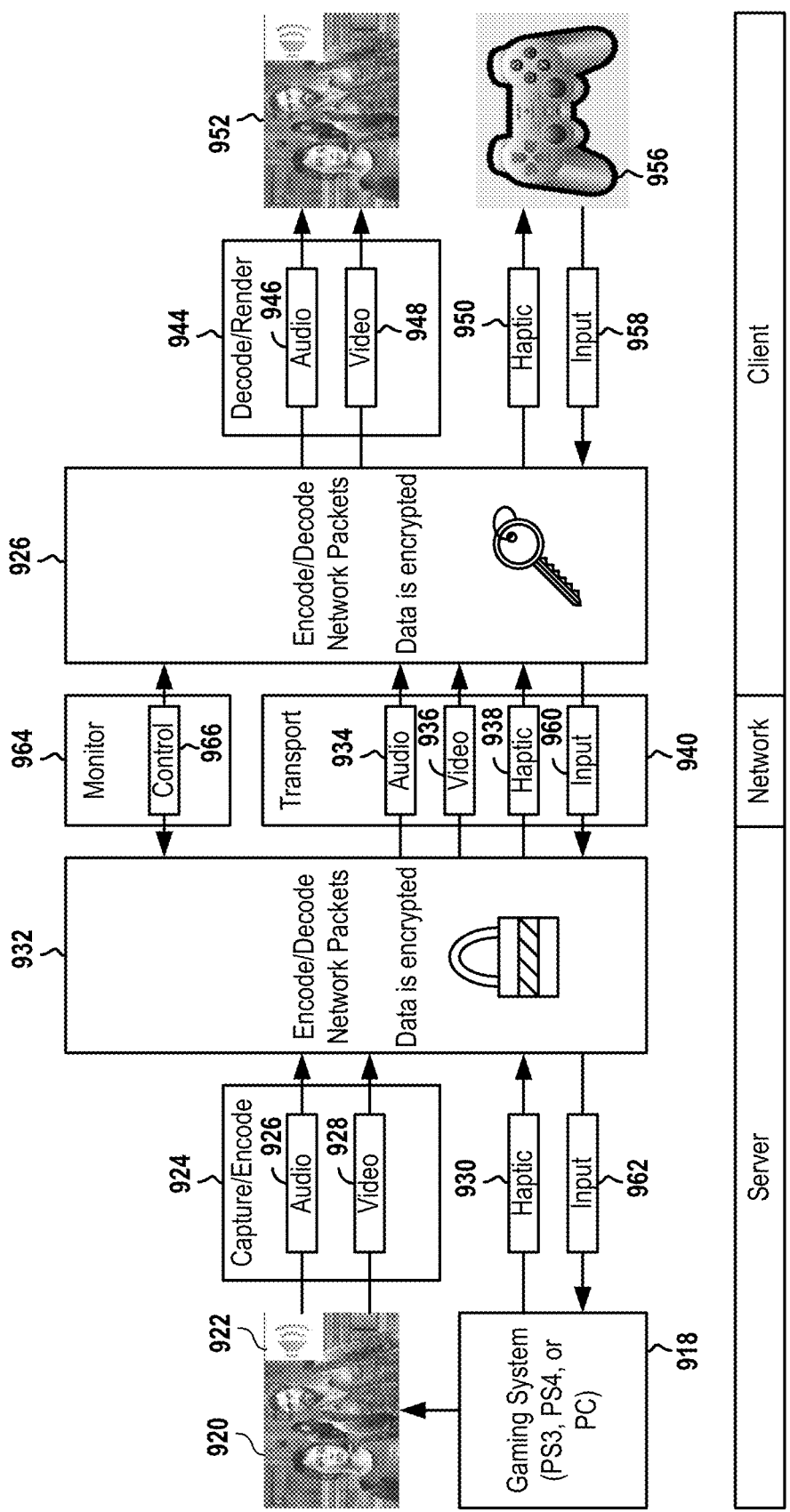
FIG. 9B is a flow diagram conceptually illustrating various operations which are performed for streaming a cloud video game to a client device, in accordance with implementations of the disclosure.

FIG. 9B is a flow diagram conceptually illustrating various operations which are performed for streaming a cloud video game to a client device, in accordance with implementations of the disclosure. The gaming system 918 executes a video game and generates raw (uncompressed) video 920 and audio 922. The video 920 and audio 922 are captured and encoded for streaming purposes, as indicated at reference 924 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 926 and encoded video 928 are further packetized into network packets, as indicated at reference numeral 932, for purposes of transmission over a network such as the Internet. The network packet encoding process can also employ a data encryption process, thereby providing enhanced data security. In the illustrated implementation, audio packets 934 and video packets 936 are generated for transport over the network, as indicated at reference 940.

The gaming system 918 additionally generates haptic feedback data 930, which is also packetized into network packets for network transmission. In the illustrated implementation, haptic feedback packets 938 are generated for transport over the network, as further indicated at reference 940.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 940, the audio, video, and haptic feedback packets are transported over a network, such as and/or including the Internet. As indicated at reference 942, the audio packets 934, video packets 936, and haptic feedback packets 938, are decoded/reassembled by the client device to define encoded audio 946, encoded video 948, and haptic feedback data 950 at the client device. If the data has been encrypted, then the network packets are also decrypted. The encoded audio 946 and encoded video 948 are then decoded by the client device, as indicated at reference 944, to generate client-side raw audio and video data for rendering on a display device 952. The haptic feedback data 950 can be processed/communicated to produce a haptic feedback effect at a controller device 956 or other interface device through which haptic effects can be rendered. One example of a haptic effect is a vibration or rumble of the controller device 956.

It will be appreciated that a video game is responsive to user inputs, and thus, a similar procedural flow to that described above for transmission and processing of user input, but in the reverse direction from client device to server, can be performed. As shown, a user operating controller device 956 may generate input data 958. This input data 958 is packetized at the client device for transport over the network to the cloud gaming system. The input data packets 960 are unpacked and reassembled by the cloud gaming server to define input data 962 on the server-side. The input data 962 is fed to the gaming system 918, which processes the input data 962 to update the game state of the video game.

During transport (ref. 940) of the audio packets 934, video packets 936, and haptic feedback packets 938, the transmission of data over the network can be monitored to ensure the cloud game stream quality of service. For example, network conditions can be monitored as indicated by reference 964, including both upstream and downstream network bandwidth, and the game streaming can be adjusted in response to changes in available bandwidth. That is, the encoding and decoding of network packets can be controlled based on present network conditions, as indicated by reference 966.

Figure 10:
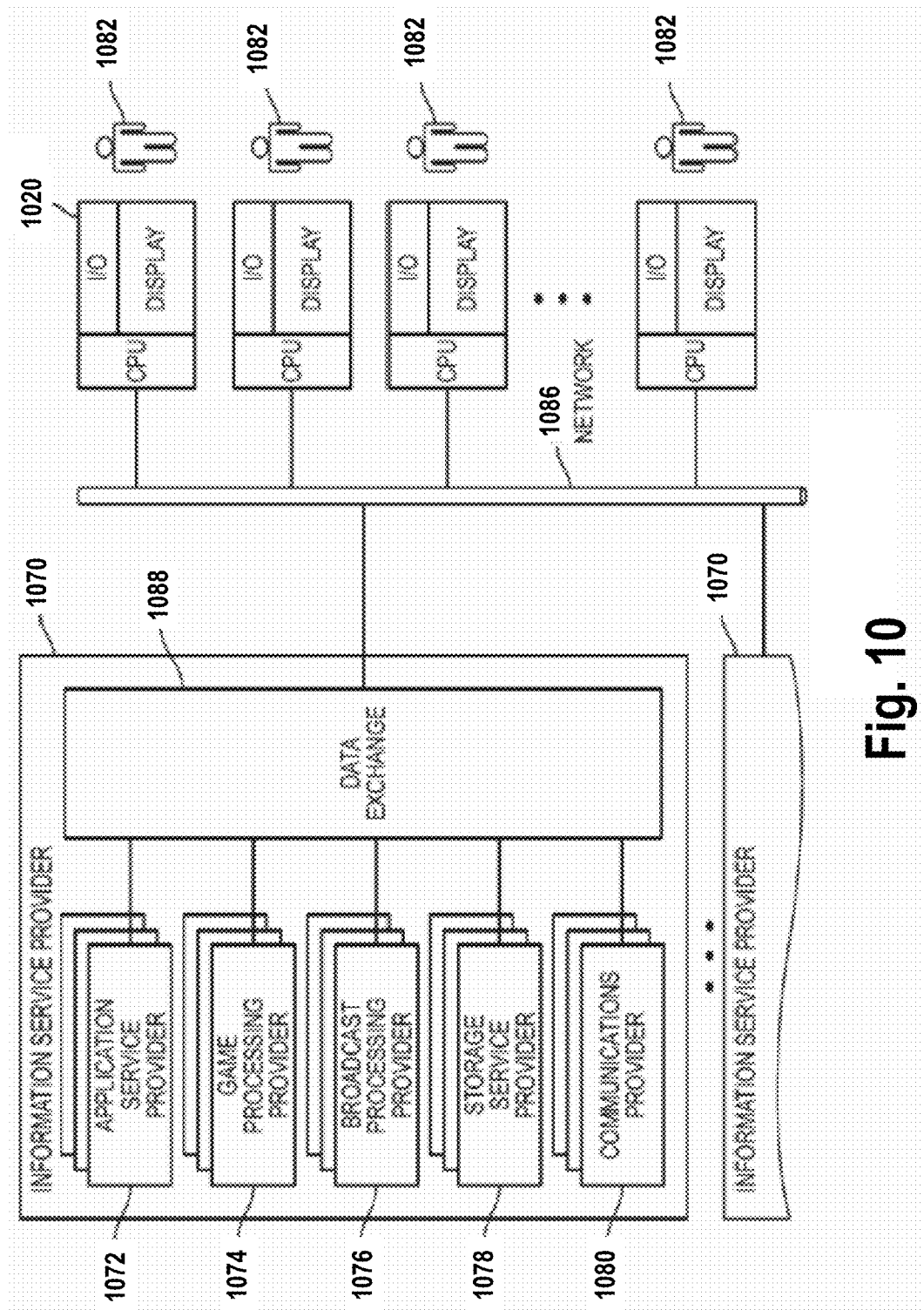
FIG. 10 illustrates an embodiment of an Information Service Provider architecture, in accordance with implementations of the disclosure.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
executing a video game;
enabling spectating of gameplay of the video game, over a network, by a plurality of spectators;
recording the gameplay of the video game that is spectated by the spectators;
receiving, over the network, comments from the spectators during the spectating of the video game;
using a semantic analysis process to analyze the comments to determine content of the comments;
responsive to the content of the comments, then analyzing the previously recorded gameplay to identify an event that occurred in the previously recorded gameplay based on one or more of the comments;
responsive to the content of the comments and the identified event, performing an action by a virtual character that is presented to the spectators.

2. The method of claim 1, wherein executing the video game includes receiving interactive input over the network from one or more client devices that are respectively associated to one or more players, and streaming video of the gameplay of the video game to the one or more client devices.

3. The method of claim 1, wherein enabling spectating of the video game includes streaming video of the gameplay of the video game or game state data of the video game over the network to client devices that are respectively associated to the spectators.

4. The method of claim 1, wherein the action performed by the virtual character includes audio voice narration by the virtual character that is presented to the spectators.

5. The method of claim 4, wherein the audio voice narration is responsive to one or more of the comments.

6. The method of claim 1, wherein the action performed by the virtual character includes generating a comment by the virtual character.

7. The method of claim 6, wherein the comment by the virtual character is responsive to one or more of the comments from the spectators.

8. The method of claim 1, wherein the comments from the spectators are defined by text information, and wherein the recognition process is configured to analyze the text information.

9. A non-transitory computer readable medium having program instructions embodied thereon, said program instructions configured, when executed by at least one computing device, to cause said at least one computing device to perform a method comprising:
    executing a video game;
    enabling spectating of gameplay of the video game, over a network, by a plurality of spectators;
    recording the gameplay of the video game that is spectated by the spectators;
    receiving, over the network, comments from the spectators during the spectating of the video game;
    using a semantic analysis process to analyze the comments to determine content of the comments;
    responsive to the content of the comments, then analyzing the previously recorded gameplay to identify an event that occurred in the previously recorded gameplay based on one or more of the comments;
    responsive to the content of the comments and the identified event, performing an action by a virtual character that is presented to the spectators.

10. The non-transitory computer readable medium of claim 9, wherein executing the video game includes receiving interactive input over the network from one or more client devices that are respectively associated to one or more players, and streaming video of the gameplay of the video game to the one or more client devices.

11. The non-transitory computer readable medium of claim 9, wherein enabling spectating of the video game includes streaming video of the gameplay of the video game or game state data of the video game over the network to client devices that are respectively associated to the spectators.

12. The non-transitory computer readable medium of claim 9, wherein the action performed by the virtual character includes audio voice narration by the virtual character that is presented to the spectators.

13. The non-transitory computer readable medium of claim 12, wherein the audio voice narration is responsive to one or more of the comments.

14. The non-transitory computer readable medium of claim 9, wherein the action performed by the virtual character includes generating a comment by the virtual character.

15. The non-transitory computer readable medium of claim 14, wherein the comment by the virtual character is responsive to one or more of the comments from the spectators.

16. The non-transitory computer readable medium of claim 9, wherein the comments from the spectators are defined by text information, and wherein the recognition process is configured to analyze the text information.

* * * * *